(12) United States Patent
Liu et al.

(10) Patent No.: US 11,224,090 B2
(45) Date of Patent: Jan. 11, 2022

(54) DATA PROCESSING METHOD AND RELATED DEVICE

(71) Applicant: GUANGDONG OPPO MOBILE TELECOMMUNICATIONS CORP., LTD., Guangdong (CN)

(72) Inventors: Jianhua Liu, Dongguan (CN); Ning Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 104 days.

(21) Appl. No.: 16/626,506

(22) PCT Filed: Aug. 4, 2017

(86) PCT No.: PCT/CN2017/096078
§ 371 (c)(1),
(2) Date: Dec. 24, 2019

(87) PCT Pub. No.: WO2019/024104
PCT Pub. Date: Feb. 7, 2019

(65) Prior Publication Data
US 2020/0120749 A1    Apr. 16, 2020

(51) Int. Cl.
*H04W 76/30* (2018.01)
*H04W 76/19* (2018.01)
*H04W 68/00* (2009.01)

(52) U.S. Cl.
CPC ......... *H04W 76/30* (2018.02); *H04W 68/005* (2013.01); *H04W 76/19* (2018.02)

(58) Field of Classification Search
None
See application file for complete search history.

(56) References Cited

U.S. PATENT DOCUMENTS 6,052,597 A * 4/2000 Ekstrom ............... H04W 64/00
455/456.3
8,743,802 B2 6/2014 Anderson
10,448,300 B2 * 10/2019 Mochizuki ............ H04W 76/15
(Continued)

FOREIGN PATENT DOCUMENTS

CN       101043741 A    9/2007
CN       101572943 A    11/2009
(Continued)

OTHER PUBLICATIONS

Samsung, titled "NR RRC State Machine, Transitions and Signalling Procedures", R2-167494. (Year: 2016).*
(Continued)

*Primary Examiner* — Jamaal Henson
(74) *Attorney, Agent, or Firm* — Ladas & Parry, LLP

(57) ABSTRACT

The application provides a data processing method and a related device. The method includes that: a first access network device transmits a paging message; the first access network device receives a first response message fed back by User Equipment (UE) to the paging message; and the first access network device determines to release the UE. With adoption of the embodiments of the application, a network-side device may determine whether to release the UE or not.

8 Claims, 5 Drawing Sheets

(56) References Cited

U.S. PATENT DOCUMENTS

| | | | | |
|---|---|---|---|---|
| 2007/0135080 A1* | 6/2007 | Islam | ............... | H04W 76/27 455/343.1 |
| 2013/0143515 A1* | 6/2013 | Zhu | ............... | H04W 76/18 455/404.1 |
| 2015/0201398 A1 | 7/2015 | Dhanda et al. | | |
| 2015/0312960 A1* | 10/2015 | Kim | ............... | H04W 72/04 370/329 |
| 2016/0183156 A1* | 6/2016 | Chin | ............... | H04L 61/2007 370/331 |
| 2018/0213452 A1* | 7/2018 | Kim | ............... | H04L 5/0053 |
| 2018/0288735 A1* | 10/2018 | Walldeen | ............... | H04W 4/70 |
| 2019/0020998 A1* | 1/2019 | Takahashi | ............... | H04W 76/30 |
| 2019/0166576 A1* | 5/2019 | Kim | ............... | H04W 36/08 |
| 2019/0191483 A1* | 6/2019 | Ryoo | ............... | H04W 76/27 |

FOREIGN PATENT DOCUMENTS

| | | | | |
|---|---|---|---|---|
| CN | 106686723 A | 5/2017 | | |
| EP | 2557890 A1 * | 2/2013 | ............ | H04W 68/005 |
| RU | 2605367 C2 | 12/2016 | | |
| WO | WO-0245456 A1 * | 6/2002 | ............ | H04W 76/30 |
| WO | 2015105805 A1 | 7/2015 | | |
| WO | 2017076156 A1 | 5/2017 | | |
| WO | WO-2017076156 A1 * | 5/2017 | ............ | H04W 36/0033 |
| WO | WO-2018114258 A1 * | 6/2018 | ............ | H04W 76/27 |
| WO | WO-2018131956 A1 * | 7/2018 | ............ | H04L 5/0053 |

OTHER PUBLICATIONS

Samsung: "NR RRC state machine, transitions and signalling procedures", 3GPP Draft; R2-167494_NR_States_Transition_V03, 3rd Generation Partnership Project (3GPP)MOBILE Competence Centre; 650, Route Des Lucioles ; F-06921 Sophia-Antipolis Cedex France, vol. RAN WG2, No. Reno, USA Nov. 14, 2016-Nov. 18, 2016 Nov. 5, 2016 (Nov. 5, 2016), XP051192778, Retrieved from the Internet: URL: http://www.3gpp.org/ftp/tsg_ran/WG2_RL2/TSGR2_96/Docs/ [ retrieved on Nov. 5, 2016 ].

ZTE Corporation: "Discussion on the issue of releasing UE", 3GPP Draft; R2-168201 Discussion on The Issue of Releasing UE, 3rd Generation Artnership Project (3GPP), Mobile Competence Centre ; 650, Route Des Lucioles F-06921 Sophia-Anti Polis Cedex; France, vol. RAN WG2, No. Reno, Nevada, USA; Nov. 14, 2016-Nov. 18, 2016 Nov. 4, 2016 (Nov. 4, 2016), XP051192424, Retrieved from the Internet URL: http://www.3gpp.org/ftp/tsg_ran/WG2_RL2/TSGR2_96/Docs/ [ retrieved on Nov. 4, 2016 ] the whole document.

Nokia et al.: "Paging and location tracking in RRC_Inactive", 3GPP Draft; R2-167708 Paging in Inactive3rd Generation Partnership Project (3GPP), Mobile Competence Centre; 650, Route Des Lucioles ; F-06921 Sophia-Antipolis Cedex; France, vol. RAN WG2, No. Reno, USA; Nov. 14, 2016-Nov. 18, 2016 Nov. 4, 2016 (Nov. 4, 2016), XP051192254, Retrieved from the Internet: URL: http://www.3gpp.org/ftp/tsg_ran/WG2_RL2/TSGR2_96/Docs/ [ retrieved on Nov. 4, 2016] the whole document.

Supplementary European Search Report in the European application No. 17920127.2, dated Jun. 18, 2020.

First Office Action of the Russian application No. 2019144789, dated Sep. 7, 2020.

Written Opinion of the International Search Authority in the international application No. PCT/CN2017/096078, dated Mar. 27, 2018.

First Office Action of the European application No. 17920127.2, dated Mar. 16, 2021.

Office Action of the India application No. 201917053564, dated Mar. 22, 2021.

First Office Action of the Canada application No. 3063225, dated Jan. 26, 2021.

International Search Report in the international application No. PCT/CN2017/096078, dated Mar. 27, 2018.

Written Opinion of the International Searching Authority in the international application No. PCT/CN2017/096078, dated Mar. 27, 2018 and English translation provided by Google Translate.

3GPP TS 36.413 V13.2.0 (Mar. 2016), "Evolved Universal Terrestrial Radio Access Network (E-UTRAN)", S1 Application Protocol (S1AP), (Release 13).

3GPP TS 38.300 V0.4.0 (Jun. 2017), "NR and NG-RAN Overall Description", Stage 2 (Release 15).

Second Office Action of the European application No. 17920127.2, dated Jul. 7, 2021.

Second Office Action of the Canadian application No. 3063225, dated Jul. 13, 2021.

3GPP TSG-RAN WG2 AdHoc R2-1706723, Qingdao, China, Jun. 27-29, 2017, Agenda Item: 10.4.1.3.4, Source: Huawei, HiSilicon, Title: State transition between RRC Connected and Inactive, Document for: Discussion and Decision, entire document.

3GPP TSG-RAN WG2 #98 R2-1704928, Hangzhou, China May 15-19, 2017, Agenda Item: 10.4.1.6, Source: InterDigital Inc., Title: RRC Modelling and State Transitions in NR, Document for: Discussion, Decision, entire document.

3GPP TSG-RAN WG2 #98 R2-1704885, Hangzhou, China, May 15-19, 2017, Agenda item: 10.4.1.6, Source: Huawei, HiSilicon, Title: RRC state transition from Inactive to Idle, Document for: Discussion and Decision, entire document.

Written Opinion of the Singaporean application No. 11201910451V, dated Aug. 20, 2021.

* cited by examiner

DATA PROCESSING METHOD AND RELATED DEVICE

CROSS-REFERENCE TO RELATED APPLICATION

This application is the U.S. national phase of PCT/CN2017/096078, filed on Aug. 4, 2017, the disclosure of which is incorporated by reference herein in its entirety.

TECHNICAL FIELD

The application relates to the technical field of communications, and more particularly to a data processing method and a related device.

BACKGROUND

In a wireless communication network, a network architecture usually consists of a Radio Access Network (RAN) and a Core Network (CN), and the RAN is connected with the CN through an interface. The RAN is connected with accessing User Equipment (UE) through a wireless interface and provides service for the UE.

When UE is attached to a RAN, the RAN may store context of an access stratum of the UE. If the RAN is intended to release the UE, the RAN is required to release the context of the UE to achieve the purpose of releasing the UE. At present, UE is usually released in the following manner: a network device initiates a paging message, the UE, after receiving the paging message initiated by the network device, initiates a connection recovery request, and the network device initiates a release command to release the UE after receiving the recovery request from the UE.

SUMMARY

Embodiments of the application provide a method for data processing and a related device, to enable a network-side device to determine whether to release UE or not.

According to a first aspect, the embodiments of the application provide a method for data processing, which may include the following operations.

A first access network device transmits a paging message.

The first access network device receives a first response message fed back by UE to the paging message.

The first access network device determines to release the UE.

According to a second aspect, the embodiments of the application provide a data processing method, which may include the following operations.

UE receives a paging message from a first access network device.

The UE feeds a first response message to the paging message back to the first access network device, the first response message being used for the first access network device to determine to release the UE.

According to a third aspect, the embodiments of the application provide an access network device, which may be applied to a communication system including a first access network device, a network device, a second access network device and UE, the access network device being the first access network device and including a communication unit and a processing unit.

The processing unit may be configured to transmit a paging message through the communication unit, receive a first response message fed back by the UE to the paging message through the communication unit, and determine to release the UE.

According to a fourth aspect, the embodiments of the application provide UE, which may include a communication unit and a processing unit.

The processing unit may be configured to receive a paging message from a first access network device through the communication unit, and feed a first response message to the paging message back to the first access network device through the communication unit, the first response message being used for the first access network device to determine to release the UE.

According to a fifth aspect, the embodiments of the disclosure provide an access network device, which may include one or more processors, one or more memories, one or more transceivers and one or more programs, the one or more programs being stored in the memory and configured to be executed by the one or more processors and the programs including instructions configured to execute the steps in the method according to the first aspect.

According to a sixth aspect, the embodiments of the disclosure provide UE, which may include one or more processors, one or more memories, one or more transceivers and one or more programs, the one or more programs being stored in the memory and configured to be executed by the one or more processors and the programs including instructions configured to execute the steps in the method according to the second aspect.

According to a seventh aspect, the embodiments of the disclosure provide a computer-readable storage medium, which may have stored a computer program for thereon electronic data exchange, the computer program enabling a computer to execute the method according to the first aspect.

According to an eighth aspect, the embodiments of the disclosure provide a computer-readable storage medium, which may have stored a computer program thereon for electronic data exchange, the computer program enabling a computer to execute the method according to the second aspect.

According to a ninth aspect, the embodiments of the disclosure provide a computer program product, which may include a non-transitory computer-readable storage medium including a computer program, the computer program being operated to enable a computer to execute the method according to the first aspect.

According to a tenth aspect, the embodiments of the disclosure provide a computer program product, which may include a non-transitory computer-readable storage medium including a computer program, the computer program being operated to enable a computer to execute the method according to the second aspect.

These aspects or other aspects of the application will become clearer and easier to understand through the following descriptions about the embodiments.

BRIEF DESCRIPTION OF DRAWINGS

In order to describe the technical solutions in the embodiments of the application or a conventional art more clearly, the drawings to be used in descriptions about the embodiments or the conventional art will be simply introduced below. It is apparent that the drawings described below are only some embodiments of the application. Other drawings may further be obtained by those of ordinary skill in the art according to these drawings without creative work.

DETAILED DESCRIPTION

Figure 1:
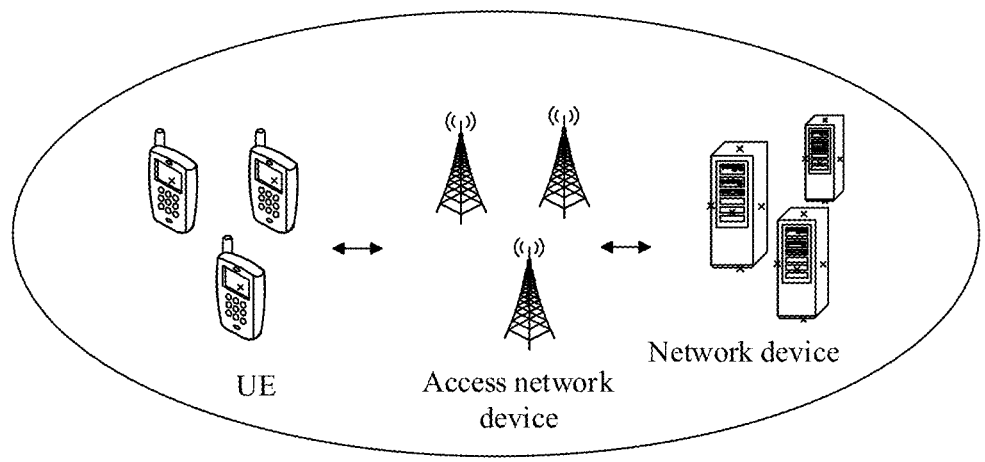
FIG. 1 is a schematic diagram of a network architecture according to an embodiment of the disclosure.

In order to make the solutions of the application understood by those skilled in the art, the technical solutions in the embodiments of the application will be clearly and completely described below in combination with the drawings in the embodiments of the application. It is apparent that the described embodiments are not all embodiments but only part of embodiments of the application. All other embodiments obtained by those of ordinary skill in the art based on the embodiments in the application without creative work shall fall within the scope of protection of the application.

Detailed descriptions will be made below respectively.

Terms "first", "second", "third", "fourth" and the like in the specification, claims and drawings of the application are adopted not to describe a specific sequence but to distinguish different objects. In addition, terms "include" and "have" and any transformations thereof are intended to cover non-exclusive inclusions. For example, a process, method, system, product or device including a series of steps or units is not limited to the steps or units which have been listed but optionally further includes steps or units which are not listed or optionally further includes other steps or units intrinsic to the process, the method, the product or the device.

"Embodiment" mentioned in the disclosure means that a specific feature, structure or characteristic described in combination with an embodiment may be included in at least one embodiment of the application. This phrase each time when appearing in the specification does not always refer to the same embodiment or refer to an independent or alternative embodiment opposite to another embodiment. It can be explicitly and implicitly understood by those skilled in the art that the embodiments described in the disclosure may be combined with other embodiments.

The embodiments of the application will be described below in combination with the drawings.

"Inactive state" is introduced into a 5-Generation (5G) system. In this state, UE keeps a connection with a CN, an access stratum connection of the UE is suspended, and an access stratum context of the UE is stored in a RAN. When the UE moves to a new RAN, the new RAN does not store the access stratum context of the UE, and the new RAN acquires the context of the UE from the original RAN of the UE. For UE in the inactive state, a RAN paging area is introduced. When there is downlink data, a RAN may transmit a paging message in a RAN paging area. When the UE moves in the in the RAN paging area, a network device may be not notified.

UE in an inactive state may be triggered to be released by a network, and the UE may be released to an idle state. At present, UE in an inactive state is usually released to an idle state by the following method: a network device initiates a paging message in an RAN paging area; the UE initiates a connection recovery request after receiving the paging message, and then the network device initiates a release command to release the UE. However, in practice, UE initiates a connection recovery request not only for the purpose of releasing the UE but also for other purposes, for example, transmitting uplink data. In such case, the network device, after receiving the connection recovery request initiated by the UE, may not definitely know whether the purpose of initiating the connection recovery request by the UE is to release the UE or not.

For solving the problem, referring to FIG. 1, FIG. 1 is a schematic diagram of a network architecture according to an embodiment of the application. The network architecture shown in FIG. 1 includes multiple UEs, multiple access network devices (for example, a first access network device and a second access network device mentioned hereinafter) and multiple network devices. The UE may be connected with the access network devices through wireless interfaces, and the access network devices may be connected with the network devices through interfaces. An access network device usually transmits a paging message for purposes of transmitting downlink data, releasing UE and the like. In the solution, the first access network device initiates a paging message for the purpose of releasing the UE, the UE being in an inactive state. The first access network device definitely knows that the paging message is initiated to release the UE, therefore, when the UE feeds back a response message to the first access network device after receiving the paging message, the first access network device may definitely determine to release the UE after the first access network device receives the response message.

The UE is a device capable of providing voice and/or data connectivity for a user, for example, a handheld device, vehicular device and the like with a wireless connection function. UE commonly includes, for example, a mobile phone, a tablet computer, a notebook computer, a palm computer, a Mobile Internet Device (MID) and a wearable device such as a smart watch, a smart band and a pedometer.

The access network device is a device capable of enabling UE to access a wireless network, and includes, but not limited to, an Evolved Node B (eNB), a Radio Network Controller (RNC), a Node B (NB), a Base Station Controller (BSC), a Base Transceiver Station (BTS), a home base station (for example, a Home eNB or a Home Node B (HNB)), a BaseBand Unit (BBU), a Mobility Management Entity (MME) and the like.

The network device refers to a node device on a network side, and for example, may be an access network device, a CN device, etc. The CN device includes, but not limited to, an MME, a Serving GateWay (SGW), a Payment Gateway (PGW), an Online Charging System (OCS), High Speed Steels (HSS) and the like.

A data processing method provided in the embodiments of the application will be described below in combination with the network architecture shown in FIG. 1 in detail.

Figure 2:
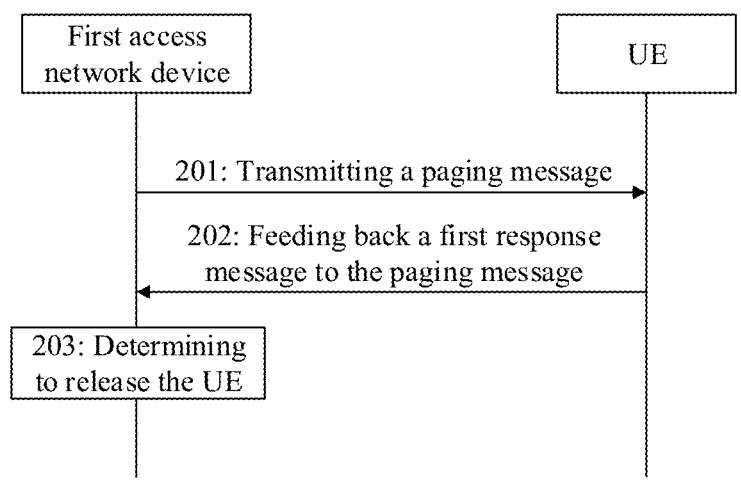
FIG. 2 is a schematic flowchart of a data processing method according to an embodiment of the disclosure.

Referring to FIG. 2, FIG. 2 is a schematic flowchart of a data processing method according to an embodiment of the application. The method includes the following steps.

In the step 201, a first access network device transmits a paging message.

In the step 202, UE receives the paging message from the first access network device, and the UE feeds back a first response message to the paging message to the first access network device.

The paging message refers to a specific message transmitted for a mobile station through a paging channel in a paging process.

An access network device usually transmits a paging message for the purposes of transmitting downlink data, releasing UE, notifying the UE of changes of system information, initiating a call to the UE in an idle state and the like.

The first access network device may directly transmit the paging message to the UE, or the first access network device may transmit the paging message to the UE through other devices. There are no limits made herein.

The UE is in an inactive state.

Besides idle and connected states supported by existing Long Term Evolution (LTE), a new state, i.e., inactive state, is further introduced into a 5G system. A main function of the inactive state is to reduce power consumption of measurement and overhead of signaling switching of the UE as much as possible when the UE transmits no data and simultaneously recover a link as fast as possible when the UE transmits data.

In the step 203, the first access network device receives from the UE the first response message fed back to the paging message, the first response message being for the first access network device to determine to release the UE, and after the first access network device receives the first response message, the first access network device determines to release the UE.

Specifically, after the first access network device determines to release the UE, the first access network device releases context of the UE. The context of the UE refers to a data set, associated with a communication behavior or entity, of the UE. The UE is attached to a network, and thus the context of the UE includes, for example, a network capability of the UE, an eNB Identity (ID), authentication information, a negotiated security algorithm, a generated key, created connection information and bearer information.

In the solution, the first access network device initiates the paging message for the purpose of releasing the UE. Since the first access network device definitely knows that the paging message is initiated to release the UE, the first access network device may definitely determine to release the UE after the first access network device receives a response message from the UE, in a case that the UE, after receiving the paging message, feeds back the response message to the paging message to the first access network device.

In an example, the UE feeds back a first message to the paging message to the first access network device, the first message containing the first response message and the first message being a first uplink message transmitted by the UE after the UE receives the paging message; and the first access network device receives the first message fed back by the UE to the paging message.

The first message is a connection recovery request message.

In an example, the UE feeds back a second message to the paging message to the first access network device, the second message containing the first response message and the second message being a second uplink message transmitted by the UE after the UE receives the paging message; and the first access network device receives the second message fed back by the UE to the paging message.

The second message is a recovery request completion message.

In an example, the first response message may include a paging response message or callee indication information.

A service type may include a caller service type and a callee service type, the callee service type is different from the caller service type, and the type of the callee indication information is the callee service type.

In an example, after the operation in the step 203 that the first access network device determines to release the UE, the method may further include the following operations:

the first access network device transmits a third message to the UE, the third message containing indication information used to instruct releasing of the UE; the UE receives the third message from the first access network device; and the UE releases a state of the UE from an inactive state to an idle state.

Specifically, after the first access network device determines to release the UE, for avoiding the condition that the first access network device has released the UE but the UE is still in the inactive state, the first access network device transmits the indication information to the UE to instruct releasing of the UE from the inactive state after the first access network device determines to release the UE.

In an example, before the operation that the first access network device transmits the paging message, the method may further include the following operation:

the first access network device receives a paging request message for the UE from a network device and receives first release indication information from a second access network device, the first release indication information being used to indicate that the paging request message is used to release the context of the UE.

In an example, before the operation that the first access network device transmits the paging message, the method may further include the following operation:

the first access network device receives second release indication information from the network device, the second release indication information being used to instruct releasing of the context of the UE.

It can be seen that release of the UE may be initiated by the first access network device, or initiated by other network devices.

In an example, the method may further include the following operation:

after the first access network device releases the UE, the first access network device transmits a second response message to the network device, the second response message being used to indicate that the context of the UE has been released.

It can be seen that, when release of the UE is initiated by the network device rather than the first access network device, the first access network device, after releasing the UE, is required to feed back a response message to the network device to notify the network device that the UE has been released.

Figure 3:
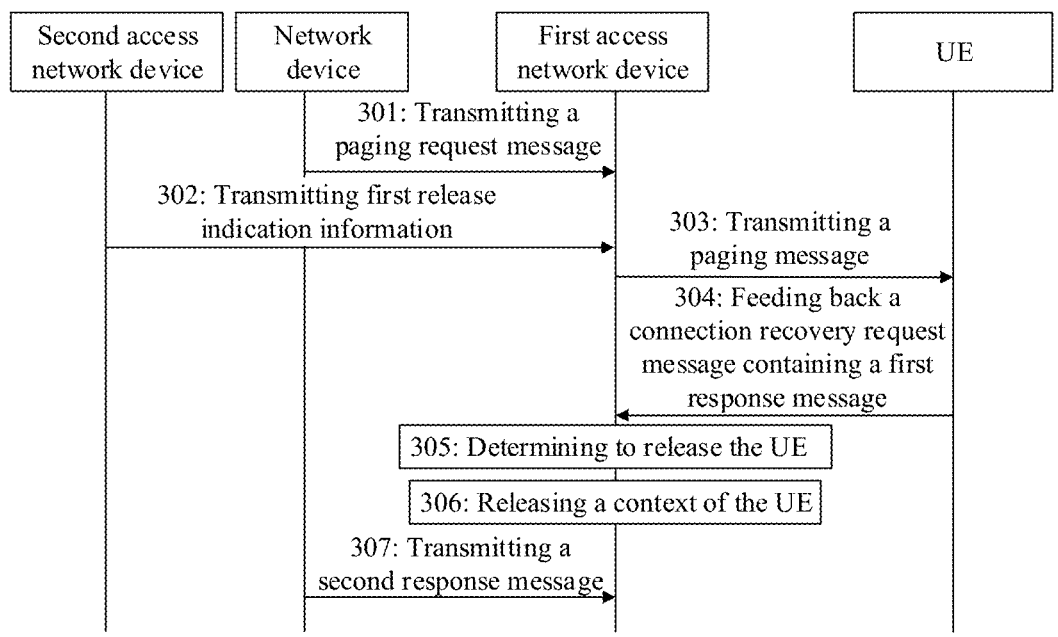
FIG. 3 is a schematic flowchart of another data processing method according to an embodiment of the disclosure.

Referring to FIG. 3, FIG. 3 illustrates another data processing method according to an embodiment of the disclosure. The method includes the following steps.

In the step 301, a network device transmits a paging request message for UE to a first access network device, the UE being in an inactive state.

In the step 302, a second access network device transmits first release indication information, the first release indication information being used to indicate that the paging request message is used to release context of the UE.

In the step 303, the first access network device receives the paging request message for the UE from the network device and receives the first release indication information from the second access network device, and the first access network device transmits a paging message.

In the step 304, the UE receives the paging message from the first access network device, and the UE feeds back a connection recovery request message to the paging message to the first access network device, the connection recovery request message containing a first response message and the first response message being used for the first access network device to determine to release the UE.

In the step 305, the first access network device receives the connection recovery request message from the UE, and the first access network device determines to release the UE.

In the step 306, the first access network device releases the context of the UE.

In the step 307, the first access network device transmits a second response message to the network device, the second response message being used to indicate that the context of the UE has been released.

It is to be noted that specific implementation modes of each step of the method shown in FIG. 3 may refer to the abovementioned method and will not be described herein.

Figure 4:
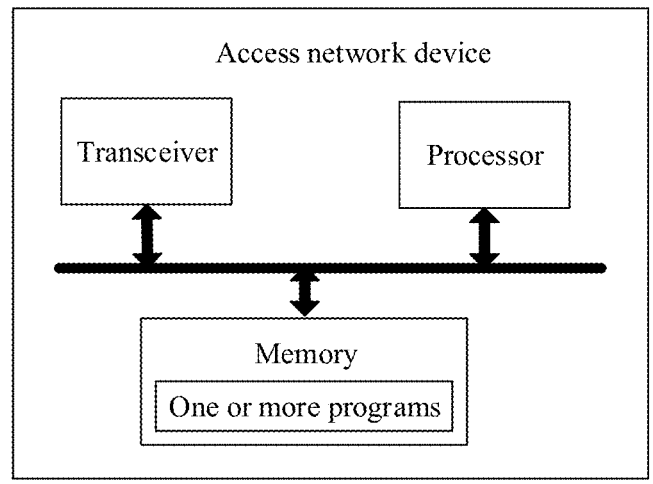
FIG. 4 is a structure diagram of an access network device according to an embodiment of the disclosure.

Consistent with the embodiment shown in FIG. 2, referring to FIG. 4, FIG. 4 is a schematic structure diagram of an access network device according to an embodiment of the disclosure. As shown in the figure, the access network device includes one or more processors, one or more memories, one or more transceivers and one or more programs. The one or more programs are stored in the memories and configured to be executed by the one or more processors. The programs include instructions configured to execute the following steps of:

transmitting a paging message;

receiving a first response message fed back by UE to the paging message; and determining to release the UE.

In an example, the UE may be in an inactive state.

In an example, in terms of receiving the first response message fed back by the UE to the paging message, the programs may include an instruction specifically configured to execute the following step of:

receiving a first message fed back by the UE to the paging message, the first message containing the first response message and the first message being a first uplink message transmitted by the UE after receiving the paging message.

In an example, in terms of receiving the first response message fed back by the UE to the paging message, the programs may include an instruction specifically configured to execute the following step of:

receiving a second message fed back by the UE to the paging message, the second message containing the first response message and the second message being a second uplink message transmitted by the UE after receiving the paging message.

In an example, the first response message may include a paging response message or callee indication information.

In an example, after the UE is determined to be released, the programs may include an instruction further configured to execute the following step of:

transmitting a third message to the UE, the third message containing indication information used to instruct releasing of the UE.

In an example, after the UE is determined to be released, the programs may include an instruction further configured to execute the following step of:

transmitting a third message to the UE, the third message containing indication information used to instruct releasing of the UE.

In an example, before the paging message is transmitted, the programs may include an instruction further configured to execute the following step of:

receiving a paging request message for the UE from a network device, and receiving first release indication information from a second access network device, the first release indication information being used to indicate that the paging request message is used to release context of the UE.

In an example, before the paging message is transmitted, the programs may include an instruction further configured to execute the following step of:

receiving second release indication information from the network device, the second release indication information being used to instruct releasing of the context of the UE.

In an example, the programs may include an instruction further configured to execute the following step of:

transmitting a second response message to the network device after the UE is released, the second response message being used to indicate that the context of the UE has been released.

Figure 5:
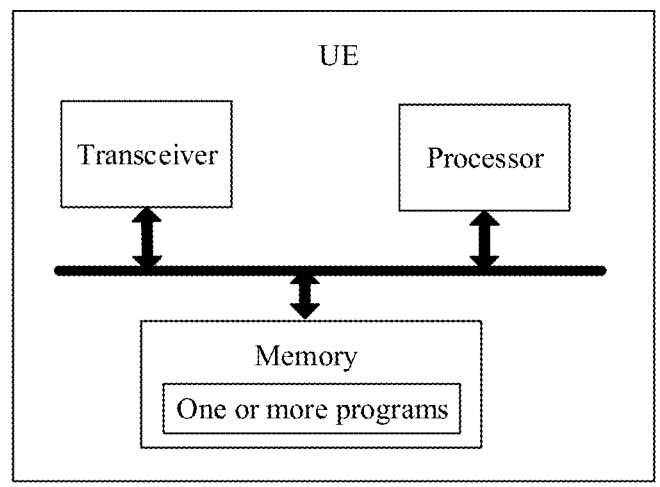
FIG. 5 is a structure diagram of UE according to an embodiment of the disclosure.

Consistent with the embodiment shown in FIG. 2, referring to FIG. 5, FIG. 5 is a schematic structure diagram of UE according to an embodiment of the disclosure. As shown in the figure, the UE includes one or more processors, one or more memories, one or more transceivers and one or more programs. The one or more programs are stored in the memories and configured to be executed by the one or more processors. The programs include instructions configured to execute the following steps of:

receiving a paging message from a first access network device;

feeding a first response message to the paging message back to the first access network device, the first response message being used for the first access network device to determine to release the UE.

In an example, the UE may be in an inactive state.

In an example, in terms of feeding back the first response message to the paging message to the first access network device, the programs may include an instruction specifically configured to execute the following step of:

feeding a first message to the paging message back to the first access network device, the first message containing the first response message and the first message being a first uplink message transmitted by the UE after receiving the paging message.

In an example, in terms of feeding back the first response message to the paging message to the first access network device, the programs may include an instruction specifically configured to execute the following step of:

feeding a second message to the paging message back to the first access network device, the second message containing the first response message and the second message being a second uplink message transmitted by the UE after receiving the paging message.

In an example, the first response message may include a paging response message or callee indication information.

In an example, after the first response message is fed back to the paging message to the first access network device, the programs may include an instruction further configured to execute the following step of:

receiving a third message from the first access network device, the third message containing indication information used to instruct releasing of the UE.

The solutions of the embodiments of the disclosure are introduced mainly from the angle of interaction between each network element. It can be understood that, for realizing the functions, the UE and the access network device may have corresponding hardware structures and/or software modules for executing each function. Those skilled in the art may easily realize that the units and algorithm steps of each example described in combination with the embodiments in the disclosure may be implemented by hardware or a combination of hardware and computer software in the disclosure. Whether a certain function is executed by hardware or in a manner of driving hardware by computer software depends on specific applications and design constraints of the technical solutions. Professionals may realize the described functions for each specific application by use of different methods, but such realization shall fall within the scope of the disclosure.

According to the embodiments of the disclosure, functional units of the UE and the access network device may be divided according to the abovementioned method examples. For example, each functional unit may be divided correspondingly to each function, and two or more than two functions may also be integrated into a processing unit. The integrated unit may be implemented in a hardware form or may also be implemented in form of software program module. It is to be noted that division of the units in the embodiment of the disclosure is schematic and logical function division only, other division manners may be adopted during practical implementation.

Figure 6:
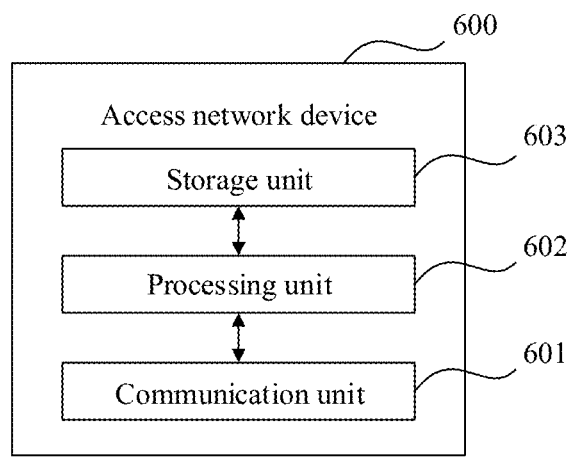
FIG. 6 is a structure diagram of another access network device according to an embodiment of the disclosure.

Under the condition that an integrated unit or module is adopted, FIG. 6 is a block diagram of possible composition of functional units of an access network device involved in the abovementioned embodiments. The access network device 600 includes a processing unit 601, a communication unit 602 and a storage unit 603. The processing unit 601 is configured to control and manage operations of the access network device, the communication unit 602 is configured to support communication between the access network device and other devices, and the storage unit 603 is configured to store a program code and data of the access network device. It is to be noted that the processing unit 601, the communication unit 602 and the storage unit 603 are configured to support execution of the steps in the methods. The descriptions are not repeated here.

The processing unit 601 may be a processor or a controller, which may be, for example, a Central Processing Unit (CPU), a universal processor, a Digital Signal Processor (DSP), an Application-Specific Integrated Circuit (ASIC), a Field Programmable Gate Array (FPGA) or other programmable logical devices, a transistor logical device, a hardware component or any combination thereof. The processing unit may implement or execute various exemplary logical blocks, modules and circuits described in combination with the contents in the disclosure. The processor may also be a combination capable of realizing a calculation function, for example, including a combination of one or more microprocessors and a combination of a DSP and a microprocessor. The communication unit 602 may be a transceiver, a transceiver circuit, a Radio Frequency (RF) chip and the like. The storage unit 603 may be a memory.

When the processing unit 601 is a processor, the communication unit 602 is a communication interface and the storage unit 603 is a memory, the access network device involved in the embodiment of the disclosure may be the access network device shown in FIG. 4.

Figure 7:
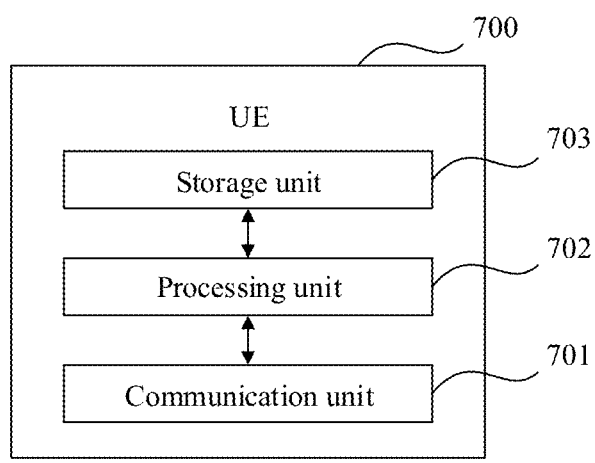
FIG. 7 is a structure diagram of another UE according to an embodiment of the disclosure.

Under the condition that an integrated unit or module is adopted, FIG. 7 is a block diagram of possible composition of functional units of UE involved in the abovementioned embodiments. The UE 700 includes a processing unit 701, a communication unit 702 and a storage unit 703. The processing unit 701 is configured to control and manage operations of the UE, the communication unit 702 is configured to support communication between the UE and other devices, and the storage unit 703 is configured to store a program code and data of the UE. It is to be noted that the processing unit 701, the communication unit 702 and the storage unit 703 are configured to support execution of the steps in the methods and descriptions are omitted.

The processing unit 701 may be a processor or a controller, which may be, for example, a CPU, a universal processor, a DSP, an ASIC, an FPGA or other programmable logical devices, a transistor logical device, a hardware component or any combination thereof. The processing unit may implement or execute various exemplary logical blocks, modules and circuits described in combination with the contents disclosed in the disclosure. The processor may also be a combination realizing a calculation function, for example, including a combination of one or more microprocessors and a combination of a DSP and a microprocessor. The communication unit 702 may be a transceiver, a transceiver circuit, an RF chip and the like. The storage unit 703 may be a memory.

When the processing unit 701 is a processor, the communication unit 702 is a communication interface and the storage unit 703 is a memory, the UE involved in the embodiment of the disclosure may be the UE shown in FIG. 5.

Figure 8:
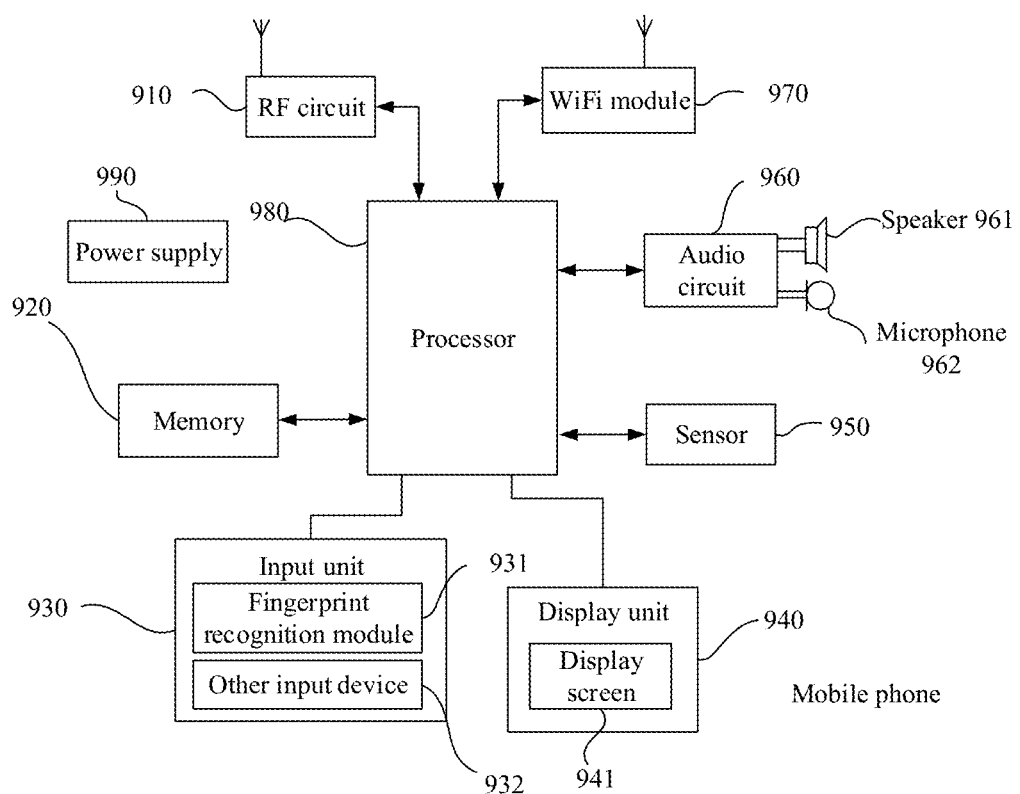
FIG. 8 is a structure diagram of yet another UE according to an embodiment of the disclosure.

An embodiment of the disclosure also provides another UE. As shown in FIG. 8, for convenient description, only parts related to the embodiment of the application are shown, and specific technical details which are undisclosed refer to parts of the method of the embodiments of the disclosure. The UE may be any UE including a mobile phone, a tablet computer, a Personal Digital Assistant (PDA), a Point of Sales (POS), a vehicular computer and the like. For example, the UE is a mobile phone.

FIG. 8 is a block diagram of part of the structure of a mobile phone related to UE according to an embodiment of the disclosure. Referring to FIG. 8, the mobile phone includes components such as an RF circuit 910, a memory 920, an input unit 930, a display unit 940, a sensor 950, an audio circuit 960, a Wireless Fidelity (WiFi) module 970, a processor 980 and a power supply 990. Those skilled in the art should know that the structure of the mobile phone shown in FIG. 8 is not intended to limit the mobile phone but may include components more or fewer than those shown in the figure, or combine some components or adopt different component arrangements.

Each component of the mobile phone will be specifically introduced below in combination with FIG. 8.

The RF circuit 910 may be configured to receive and transmit information. The RF circuit 910 usually includes, but not limited to, an antenna, at least one amplifier, a transceiver, a coupler, a Low Noise Amplifier (LNA), a duplexer and the like. In addition, the RF circuit 910 may also communicate with a network and other devices through wireless communication. Any communication standard or protocol may be adopted for wireless communication, including, but not limited to, a Global System of Mobile communication (GSM), a General Packet Radio Service (GPRS), Code Division Multiple Access (CDMA), Wideband Code Division Multiple Access (WCDMA), LTE, an electronic mail, Short Messaging Service (SMS) and the like.

The memory 920 may be configured to store a software program and a module. The processor 980 may operate the software program and module stored in the memory 920, thereby executing various function applications and data processing of the mobile phone. The memory 920 may mainly include a program storage region and a data storage region. The program storage region may store an operating system, an application program required by at least one function and the like. The data storage region may store data created based on use of the mobile phone and the like. In addition, the memory 920 may include a high-speed Random Access Memory (RAM) and may further include a nonvolatile memory, for example, at least one disk storage device, flash memory device or other volatile solid-state storage device.

The input unit 930 may be configured to receive input digital or character information and generate key signal input related to user setting and function control of the mobile phone. Specifically, the input unit 930 may include a fingerprint recognition module 931 and other input devices 932. The fingerprint recognition module 931 may acquire fingerprint data of a user thereon. Besides the fingerprint recognition module 931, the input unit 930 may further include other input devices 932. Specifically, other input devices 932 may include, but not limited to, one or more of a touch screen, a physical keyboard, a function key (for example, a volume control button and a switch button), a trackball, a mouse, a stick and the like.

The display unit 940 may be configured to display information input by the user or information provided for the user and various menus of the mobile phone. The display unit 940 may include a display screen 941. Optionally, the display screen 941 may be configured in form of Liquid Crystal Display (LCD) and Organic Light-Emitting Diode (OLED). In FIG. 8, the fingerprint recognition module 931 and the display screen 941 realize input and output functions of the mobile phone as two independent components. However, in some embodiments, the fingerprint recognition module 931 and the display screen 941 may be integrated to realize the input and play functions of the mobile phone.

The mobile phone may further include at least one sensor 950, for example, a light sensor, a motion sensor and other sensors. Specifically, the light sensor may include an environmental light sensor and a proximity sensor. The environmental light sensor may regulate brightness of the display screen 941 according to brightness of environmental light, and the proximity sensor may turn off the display screen 941 and/or backlight when the mobile phone is moved to an ear. As a motion sensor, an accelerometer sensor may detect a magnitude of an acceleration in each direction (usually three axes), may detect a magnitude and direction of the gravity under a motionless condition, and may be configured for an application for recognizing a posture of the mobile phone (for example, landscape and portrait switching, a related game and magnetometer posture calibration), a vibration recognition related function and the like (for example, a pedometer and knocking). Other sensors, for example, a gyroscope, a barometer, a hygrometer, a thermometer and an infrared sensor, which may be configured in the mobile phone will not be elaborated herein.

An audio circuit 960, a speaker 961 and a microphone 962 may provide an audio interface between a user and the mobile phone. The audio circuit 960 may transmit an electric signal converted from received audio data to the speaker 961, and the speaker 961 converts the electric signal into a sound signal for playing. On the other hand, the microphone 962 converts a collected sound signal into an electric signal, the audio circuit 960 receives and converts the electric signal into audio data, and the audio data is processed by the playing processor 980 and transmitted to, for example, another mobile phone through the RF circuit 910, or the audio data is played to the memory 920 for further processing.

WiFi is a short-distance wireless transmission technology. The mobile phone may help a user through the WiFi module 970 to receive and transmit an electronic mail, browse a webpage, access streaming media and the like, and wireless wideband Internet access is provided for the user. Although the WiFi module 970 is shown in FIG. 8, it can be understood that it is not a necessary composition of the mobile phone and may completely be omitted according to a requirement without changing the scope of the essence of the disclosure.

The processor 980 is a control center of the mobile phone, connects each part of the whole mobile phone via various interfaces and lines and executes various functions and data processing of the mobile phone by running or executing the software program and/or module stored in the memory 920 and calling data stored in the memory 920, thereby monitoring the whole mobile phone. Optionally, the processor 980 may include one or more processing units. Preferably, the processor 980 may integrate an application processor and a modulation and demodulation processor. The application processor mainly processes the operating system, a user interface, an application program and the like. The modulation and demodulation processor mainly processes wireless communication. It can be understood that the modulation and demodulation processor may also not be integrated into the processor 980.

The mobile phone may further include the power supply 990 for supplying power to each part. Preferably, the power supply may be logically connected with the processor 980 through a power management system, thereby realizing management of charging and discharging, management of power consumption and the like through the power management system.

Although not shown in the figure, the mobile phone may further include a camera, a Bluetooth module and the like, which will not be elaborated herein.

In the embodiments shown in FIG. 2 and FIG. 3, the flows on a UE side in each step of the method may be implemented based on the structure of the mobile phone.

In the embodiment shown in FIG. 7, each functional unit may be implemented based on the structure of the mobile phone.

An embodiment of the disclosure also provides a computer-readable storage medium, which stores a computer program for electronic data exchange, the computer program enabling a computer to execute part or all of the steps executed by an access network device in, for example, the abovementioned method embodiments.

An embodiment of the disclosure also provides a computer-readable storage medium, which stores a computer program for electronic data exchange, the computer program enabling a computer to execute part or all of the steps executed by UE in, for example, the abovementioned method embodiments.

An embodiment of the disclosure further provides a computer program product. The computer program product includes a non-transitory computer-readable storage medium having stored a computer program. The computer program may be operated to enable a computer to execute part or all of the steps executed by an access network device in, for example, the abovementioned methods. The computer program product may be a software installation package.

An embodiment of the disclosure further provides a computer program product. The computer program product includes a non-transitory computer-readable storage medium having stored a computer program. The computer program may be operated to enable a computer to execute part or all of the steps executed by UE in, for example, the abovementioned method embodiments. The computer program product may be a software installation package.

The steps of the method or algorithm described in the embodiments of the disclosure may be implemented in a hardware manner, and may also be implemented in a manner of executing, by a processor, software. A software instruction may consist of a corresponding software module, and the software module may be stored in a RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. Of course, the storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art may realize that, in one or more abovementioned examples, all or part of the functions described in the embodiments of the disclosure may be realized through software, hardware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or other programmable devices. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The abovementioned specific implementation modes further describe the purposes, technical solutions and beneficial effects of the embodiments of the disclosure in detail. It is to be understood that the above is only the specific implementation mode of the embodiments of the disclosure and not intended to limit the scope of protection of the embodiments of the disclosure. Any modifications, equivalent replacements, improvements and the like made based on the technical solutions of the embodiments of the disclosure shall fall within the scope of protection of the embodiments of the disclosure.

What is claimed is:

1. A method for data processing, comprising:
    receiving, by a first access network device, a paging request message for User Equipment (UE) from a network device and receiving first release indication information from a second access network device, the first release indication information being used to indicate that the paging request message is used to release context of the UE;
    transmitting, by the first access network device, a paging message;
    receiving, by the first access network device, a first response message fed back by the UE to the paging message;
    determining, by the first access network device, to release the UE;
    transmitting, by the first access network device, a third message to the UE, the third message containing indication information used to instruct releasing of the UE; and
    transmitting, by the first access network device, a second response message to the network device after the UE is released, the second response message being used to indicate that the context of the UE has been released.

2. The method of claim 1, wherein receiving, by the first access network device, the first response message fed back by the UE to the paging message comprises:
    receiving, by the first access network device, a first message fed back by the UE to the paging message, the first message containing the first response message and the first message being a first uplink message transmitted by the UE after the UE receives the paging message; or,
    receiving, by the first access network device, a second message fed back by the UE to the paging message, the second message containing the first response message and the second message being a second uplink message transmitted by the UE after the UE receives the paging message.

3. The method of claim 1, wherein the first response message comprises a paging response message or callee indication information.

4. The method of claim 1, before transmitting, by the first access network device, the paging message, the method further comprises:
    receiving, by the first access network device, second release indication information from the network device, the second release indication information being used to instruct releasing of context of the UE.

5. A non-transitory computer-readable storage medium, having stored a computer program thereon for electronic data exchange, wherein the computer program enables a computer to execute the method of claim 1.

6. An access network device, comprising one or more processors, one or more memories, one or more transceivers and one or more programs, the one or more programs being stored in the memory and configured to be executed by the one or more processors, and the programs comprising instructions configured to execute steps of:
    receiving a paging request message for User Equipment (UE) from a network device and receiving first release indication information from another access network device, the first release indication information being used to indicate that the paging request message is used to release context of the UE;
    transmitting a paging message;

receiving a first response message fed back by the UE to the paging message;

determining to release the UE;

transmitting a third message to the UE, the third message containing indication information used to instruct releasing of the UE; and transmitting a second response message to the network device after the UE is released, the second response message being used to indicate that the context of the UE has been released.

7. The access network device of claim 6, wherein the transceiver is configured to:

receive a first message fed back by the UE to the paging message, the first message containing the first response message and the first message being a first uplink message transmitted by the UE after the UE receives the paging message; or, receive a second message fed back by the UE to the paging message, the second message containing the first response message and the second message being a second uplink message transmitted by the UE after the UE receives the paging message.

8. The access network device of claim 6, wherein the transceiver is configured to:

receive second release indication information from the network device, the second release indication information being used to instruct releasing of context of the UE.

* * * * *